United States Patent [19]

Stewart et al.

[11] Patent Number: 4,600,205
[45] Date of Patent: Jul. 15, 1986

[54] STEERING APPARATUS FOR MOTOR VEHICLES

[75] Inventors: Denzil S. Stewart; Alfred J. Bland, both of Canoga Park; Donald D. Rogers, Moorpark, all of Calif.

[73] Assignee: Steering Control Systems, Inc., Canoga Park, Calif.

[21] Appl. No.: 658,304

[22] Filed: Oct. 5, 1984

[51] Int. Cl.[4] .............................................. B62D 7/08
[52] U.S. Cl. .................................. 280/95 R; 180/79; 180/157; 180/160
[58] Field of Search ............... 280/95 R; 60/420, 484, 60/486; 180/79, 157, 159, 160

[56] References Cited

U.S. PATENT DOCUMENTS

| | | | |
|---|---|---|---|
| 3,587,767 | 6/1971 | Gamaunt | 280/95 R |
| 3,746,119 | 7/1973 | Gross | 280/95 R |
| 3,826,328 | 7/1974 | Sheppard | 280/95 R |

Primary Examiner—Richard A. Bertsch

[57] ABSTRACT

A steerable control system for roadable vehicles includes an axle 16 having rotatably mounted wheels 14a and 14b upon the respective ends thereof. These wheels each include a king pin assembly 60 connected to the axle ends by a pair of king pins 76. Nested within a tapered hole 78 through a spindle member 70 in each of the king pin assemblies 60 is a tapered section 36 of a steering arm 32. A control arm portion 46 of each steering arm 32 is angled outward and backward from the tapered section 36 and generally toward a well of the adjacent wheel 14a or 14b. Attached to the perforate ends 50 of the arms 32 are the ends 86 of a tie rod 30 such that lateral movement of the tie rod 30 causes the arms 32 to rotate the wheels 14a and 14b upon the axle 16, the result being a tighter turning radius with a truer wheel rolling motion than in standard steering systems.

16 Claims, 7 Drawing Figures

STEERING APPARATUS FOR MOTOR VEHICLES

TECHNICAL FIELD

This invention is designed for use in motor vehicles, particularly in the field of large trucks wherein rapid tire wear results from an improper geometric and mechanical relationship between the components making up the steering apparatus. The system of this invention provides a combination of components so geometrically arranged as to substantially improve turning characteristics and reduce tire wear of the steerable wheels of the vehicle.

BACKGROUND ART

It is noteworthy that the principal art in the field of this invention was generated during the first several years of the twentieth century, the latest pertinent patents located in our novelty search having been dated in 1934. This indicates that the state-of-the-art in this field is little improved since then, with nothing of relative significance having been accomplished in over fifty years.

It has long been an accepted principle within the vehicle steering field that the so-called Ackermann principle should be followed in the design of steering linkage mechanisms. In general, that principle holds that a projection of the turning axes of the two turning steering wheels intersect one another at a point along a projection of the common axis of the rear wheels, the theory being that this will result in a pure rolling motion of the wheels. However, as described by R. B. Kozmier in his 1962 paper entitled, "Using of Computers in Steering Geometry Analysis," presented to the Society of Automotive Engineers, the Ackermann principle further holds that "a given steering linkage gives perfect steering for only one turning angle of the wheels." Error in other turning angles is indicated as being introduced by the relative lengths and inclinations of the steering arms, the requirement for best operation being "the selection of the proper combination of tie rod and steering arm lengths that will minimize the error throughout the steering range."

Otherwise stated, it will become immediately apparent that adoption of the Ackermann principle in the design of a vehicle steering mechanism will result in a system wherein the desired "pure rolling motion" is absent during all turning angles except one; and that wheel skidding, tire scuffing and steering controllability will occur to an ever increasing extent as the angle of turn away from that single pure turning angle increases. It will also be apparent that there is a finite wheel turning range within which substantial improvements can be made.

In view of the foregoing an important objective of the present invention is to reduce tire scuffing in turns and to improve the general steering characteristics of the vehicle.

The prior art patents mentioned briefly above almost universally discuss and apply the Ackermann principle, but describe mechanisms and detailed components differing from one another in varying degree. Indeed, the 1878 U.S. Pat. No. 205,330, directed to a Velocipede, was issued to Mr. H. Ackermann himself, although it does not set forth the principle which ultimately bore his name. The first recitation of the Ackermann principle appears in U.S. Pat. No. 663,986, issued in 1900, the principle being set forth in some detail therein, although it is not so identified.

Other patents located include U.S. Pat. Nos. 687,588, 686,684, 695,222, 714,501, 690,802, 723,975, 743,013, 1,058,758, 1,111,693, 1,223,469, U.S. Pat. No. Re. 14,385, U.S. Pat. Nos. 1,315,126, 1,551,711, 1,766,506, 1,768,347, 1,787,345, 1,942,263, and 1,775,624, several of which describe the Ackermann principle in some detail. The others are variously directed to mechanisms and components of various types to improve steering and vehicle handling qualities.

DISCLOSURE OF INVENTION

For purposes of describing this invention, the following meanings will be ascribed to the respective terms.

Castor relates to the inclination of the king pin. Although not important to this invention, for purposes of discussion, when the king pin is inclined forward the castor is positive, and when inclined backward the castor is negative, with the vertical being indicated as zero castor.

Camber is the inward or outward inclination of the wheels from the vertical.

Toe in and toe out, features of considerable importance in the present invention, relate to the degree to which the individual steerable wheels are angled in or out from their straight forward positions.

This invention, therefore, is directed to a steering system for roadable vehicles. Its most specific and useful application is for trucks having relatively long wheel bases. It is in vehicles of this character that the greatest difficulties have been experienced by operators. In particular, due to their long wheel bases, their weight and the large amount of power applied to the wheels by their powerful engines during operation, such vehicles encounter an extreme amount of the above-mentioned scuffing or dragging of the outside wheel during turns. Hence, they suffer severe tire wear, especially turning maneuvers which are relatively tight. The resulting loss of rubber and the great desirability of significantly reducing it is a primary reason for this invention. In some instances, especially on trucks which constantly operate with heavy loads and tight turning movements, the use of this invention has resulted in tire wear as little as one-third of what was previously considered to be normal wear.

This saving is accomplished by departing from the teachings of the Ackermann principle. Steering arms are provided which are relatively short, as compared to conventional steering arms, and which extend rearward and outward from their respective king pin positions. Hence, the terminal ends of the steering arms, to which the tie rods are connected, are positioned essentially within, or very near to the interior side of, the wheel well. This position results in a tie rod length which is longer in relation to the axle than that of standardly designed vehicles. This feature, in turn, determines the amount of toe in or toe out to be applied to the vehicle and controls the angle of turn over which an essentially pure rolling motion occurs during operation.

While the steering arms are at the heart of the invention, and they provide its central controlling feature, the complete system, including the generally increased length of the tie rod and the overall geometric configuration of the system, which defines the means for establishing of a particular toe out condition while facilitating a tight turning radius with accurate rolling of the tires, defines the balance of the invention.

It is therefor a major object of this invention to provide an improved steering geometry for a roadable vehicle whereby tire drag and skidding during turning maneuvers can be reduced.

Another object is to provide a steering system wherein the steering arms are designed to angle generally outward from the wheel spindles toward the wheels. Additional objects of invention are to provide a pair of identical steering arms, reversible for use on either side of the vehicle, and configured to extend into the regions of the wheel wells on an internal side thereof.

A further object is to provide a steering system wherein the front axle, steering arms and tie rods are combined in a configuration to guide the wheels during turns to roll, substantially without sliding.

Another object is to meet the foregoing objectives by providing tapered steering arms of shorter than normal length and capable of use with a wide range of wheels and tires, such arms being angled outward from a first axis, or the shank portion axis, and along a second axis, or the axis of the tapered region, and adjusted to provide a toe out angle of more than 0° and which results in an optimum toe out correction in a full turn.

BEST MODE FOR CARRYING OUT THE INVENTION

Figure 1:
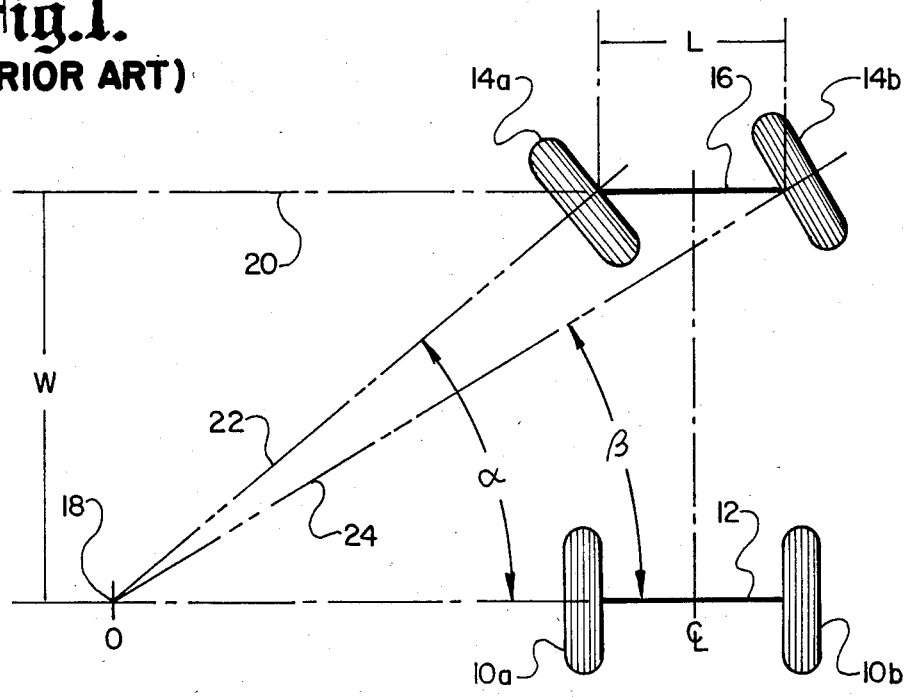
FIG. 1 is a schematic representation of the plan view of a typical truck frame and wheel arrangement illustrating the conventional Ackermann principal.

Referring now to the drawings in detail, FIG. 1 shows the typical prior art system, specifically illustrating the long-accepted Ackermann principle. A pair of fixed-direction wheels 10a and 10b are mounted for rotation upon a rear axle 12, and a pair or steerable wheels 14a and 14b are rotatably mounted upon a front axle 16, both pair of wheels being conventionally positioned about the center line of the vehicle chasis. The center lines of the rear and front axles are represented by the axle lines 18 and 20, respectively. The lines 22 and 24 represent the axes of the respective steerable wheels 14a and 14b. Here, in accordance with Ackermann, it will be seen that a pure turning angle of each front wheel is achieved when the inner wheel 14a is turned further inward ($<\alpha$) in a tighter cramp than is the outer wheel 14b ($<\beta$), causing the inner wheel to travel a shorter distance than the outer wheel during a turn, and when the axes 22 and 24 intersect upon the rear axle centerline 20.

As noted above, the pure turning angle, in such a configuration, can be achieved at one precise turning angle only, with the turning efficiency deteriorating rapidly upon either side of that angle.

Figure 2:
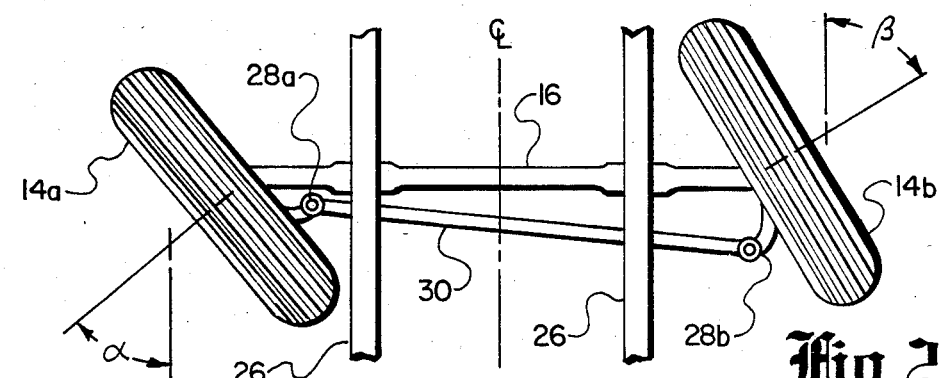
FIG. 2 is a plan view of a truck front end steering mechanism illustrated in a full turn, showing the wheels in an incorrect toe out condition.

In Ackermann-style steering systems it has been the practice to utilize steering arms which are manufactured such that they extend generally inward at an angle from their king pin connection and toward the truck chassis centerline. Such a configuration is illustrated in FIG. 2. Therein the truck chassis 26 supports the front axle 16, upon the respective ends of which are mounted the wheels 14a and 14b. Connected to a pair of conventional king pins (not shown), about which the wheels are caused to turn, are a pair of left-hand and right-hand steering arms 28a and 28b which are manufactured mirror images of one another. They extend generally inward, usually in an arcuate pattern, toward the center line of the vehicle. These steering arms are interconnected by an adjustable length tie rod 30.

It is of note that this configuration is representative of an extreme toe out condition and that, therefore, there is a considerable difference in the angles $\alpha$ and $\beta$, the angle $\alpha$ representing a wheel turning angle significantly less than that of angle $\beta$. The result will be that during a turn the tire of wheel 14b will be required to negotiate the turn in a sliding or skidding action, thereby causing the tire rubber to be rapidly worn or scuffed away. While it is possible to adjust the tie rod 30 to a longer length, cutting down on the toe out condition, the geometry, nevertheless, results in the same undesirable turning detriment, albeit somewhat less sever.

Figure 3:
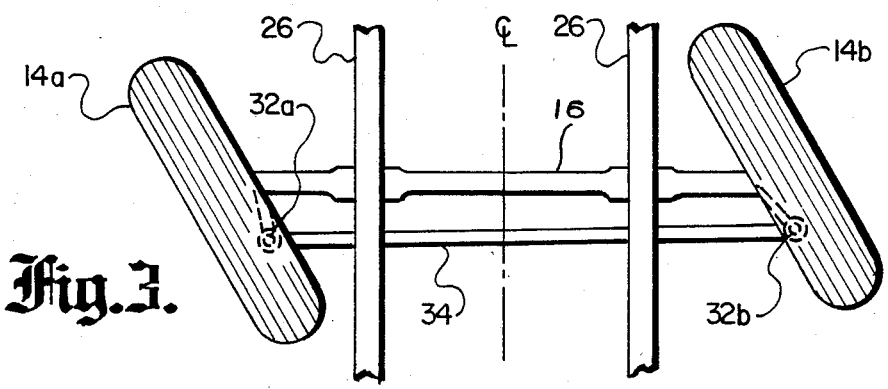
FIG. 3 is a plan view of a truck front end steering mechanism illustrating the correct geometry in a full turn for a wheel base of a given length.
Figure 4:
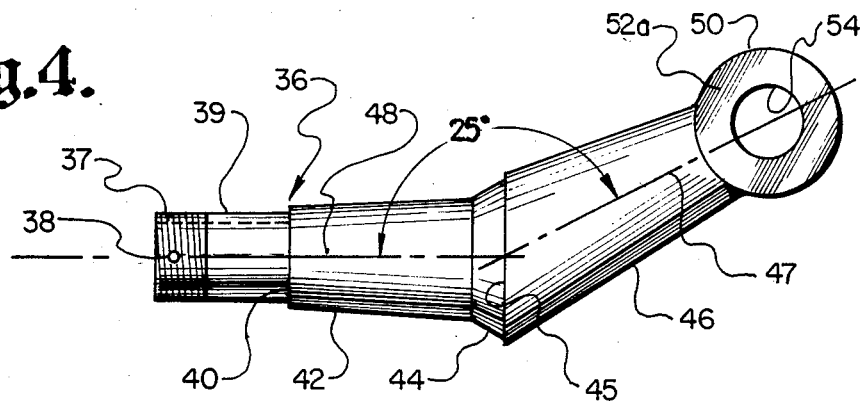
FIG. 4 is a plan view of a typical steering arm of this invention.

Taking the foregoing into consideration, the present invention is representatively shown in FIG. 3. Therein, the same chassis 26, front axle 16 and wheels 14a and 14b are provided. In this instance, however, a pair of steering arms 32a and 32b, designed in accordance with the principles of this invention and as illustrated in FIG. 4, are provided. The arms 32a and 32b are not right and left-hand mirror images of one another. Rather, they are identically designed and manufactured units, fully reversible for use upon either the right or the left side of the steering mechanism. Additionally, they extend outward from, rather than inward toward, the chassis centerline. Their outer extremeties, which are attached to the ends of the tie rod 34, terminate at or near the inner sides of the wheel wells. In some instances they actually extend into the interior of the wheel wells to a slight extent.

It will be recognized immediately that one of the results of such a steering arm configuration is to provide maximum physical protection to those steering arms, since they are partially shielded by the wheel from the physical abuse often encountered by the mechanical components of trucks, as are the steering arms 28a and 28b of FIG. 2, for example.

It is also apparent that the tie rod 34 of FIG. 3 must be longer than the rod 30 of FIG. 2, since the ends of the steering arms 32a and 32b are further apart than their counterparts in FIG. 2.

Hence, the geometric steering mechanism configuration of the two systems are quite distinct from one another. It is this difference which defines the principal uniqueness of the present invention and causes it to depart from the details of systems following the Ackermann principle. In the present instance the wheel axes during a pure turn do not cross upon the centerline of the rear axle. Rather, it has been found that they cross approximately 25% closer to the front axle than was taught by Ackermann. For example, with a wheel base of 144", an axle length of 63", a steering arm of 5.75" and a tie rod of 62", the wheel centerlines cross at 27° forward of the rear axle when the wheels are in a true turn.

A better understanding of the nature of the steering arms of this invention will be obtained by studying the showing of FIG. 4. Therein, the overall steering arm 32, includes a straight shank portion 36, of constant cross-section, including a threaded end portion 37 having a cotter pin hole 38 through the thread portion for retention and locking purposes and having a longitudinal keyway 39. The shank portion 36 additionally has a radial shoulder 40 which acts as a stop for preventing overinsertion of the entire shank 36, and a relatively shallow outwardly tapered region 42 extending therefrom. A short, more steeply tapered region 44 extends from the region 42 and terminates in a second radially extending flange 45.

An arm portion 46 extends from the shank 36, its centerline 47 being oriented at a predetermined angle from the centerline 48 of the shank portion 36. An angle of between about 20° and about 30°, with a preferred angle of about 25°, has been found to be effective in meeting the objectives of this invention.

The arm portion 46 is relatively short, as compared to steering arms of the prior art. It is also tapered generally downward to a boss member 50, machined to include a pair of smooth, parallel surfaces 52a and 52b on its opposite sides, and having a bolt-receiving hole 54 drilled centrally therethrough. The hole 54, as mentioned above, is sometimes tapered to accept a mating mechanical element.

The described steering arm 32, as heretofore mentioned, except for those occasions when the hole 54 is tapered, is completely reversable, being usable as either a left-hand or a right-hand member in the steering mechanism. Even on those occasions the arm is reversible by placing the tie rod above, rather than below. The arm is forged for maximum strength from a high grade steel. The short arm portion 46 provides a unit of maximum strength for acceptance of maximum loads from the tie rod and for the transfer to those loads to the king pin without structured deflection or bending and without danger of fracturing the arm.

The reversibility of this steering arm provides certain advantages, namely, since only a single forging configuration is required only one set of tooling must be provided; i.e., no left-hand version is generally necessary, (except where, as above, a tapered hole 54 is used), the production level can be increased and the cost decreased as a result of the size of the production run, only one part must be maintained in stock, and installation by the mechanic is made simpler and more foolproof.

The present steering arm is considerably shorter than prior art arms, permitting it to be directed outward into the wheelwell region described herein. In general, prior art arms are relatively long and curved inward toward the vehicle centerline. They are also usually dipped down toward the rear of the truck. Hence, tie rods connecting the steering arm ends are regularly carried low and about 7½ to 9 inches rearward of the axle, making them highly vulnerable to road hazard damage, particularly around construction sites and other areas of rough terrain. Bent tie rod tubes and vehicle misalignment are common under these circumstances.

By contrast, in the present system, the tie rod is mounted higher behind the axle and need be only about 4½ inches behind that axle. Hence, it is considerably less vulnerable than are systems of the described prior art.

The short length of the steering arm also accommodates its universal use with a wide range of wheel and tire sizes and shapes without fear of its being engaged by the tires. A prior art arm, if reversed to point outward rather than inward, would engage the wheel or the tires, with resulting inoperability, or the physical destruction of both parts.

Figure 5:
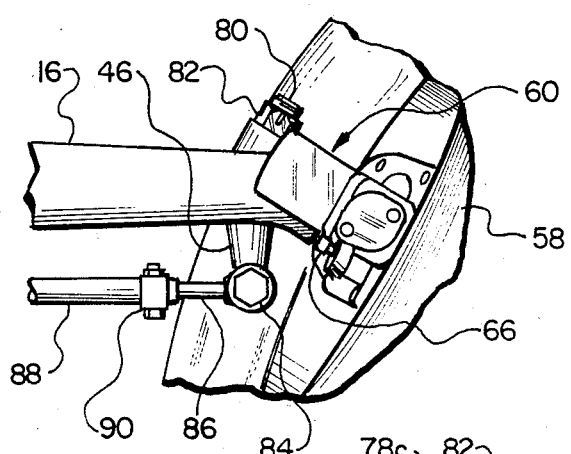
FIG. 5 is a view of the same mechanism, looking down with the wheel turned to the right.
Figure 6:
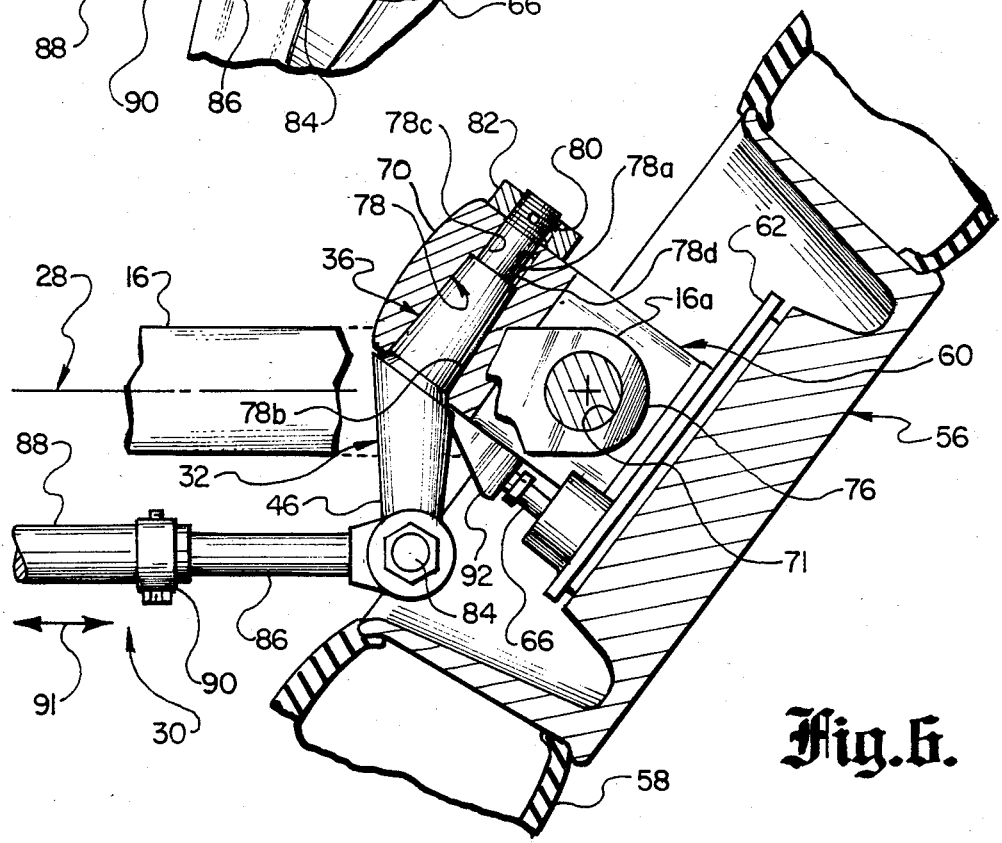
FIG. 6 is a sectional view of the wheel of FIG. 5, cut away to better illustrate a right front wheel region of the invention in greater detail.
Figure 7:
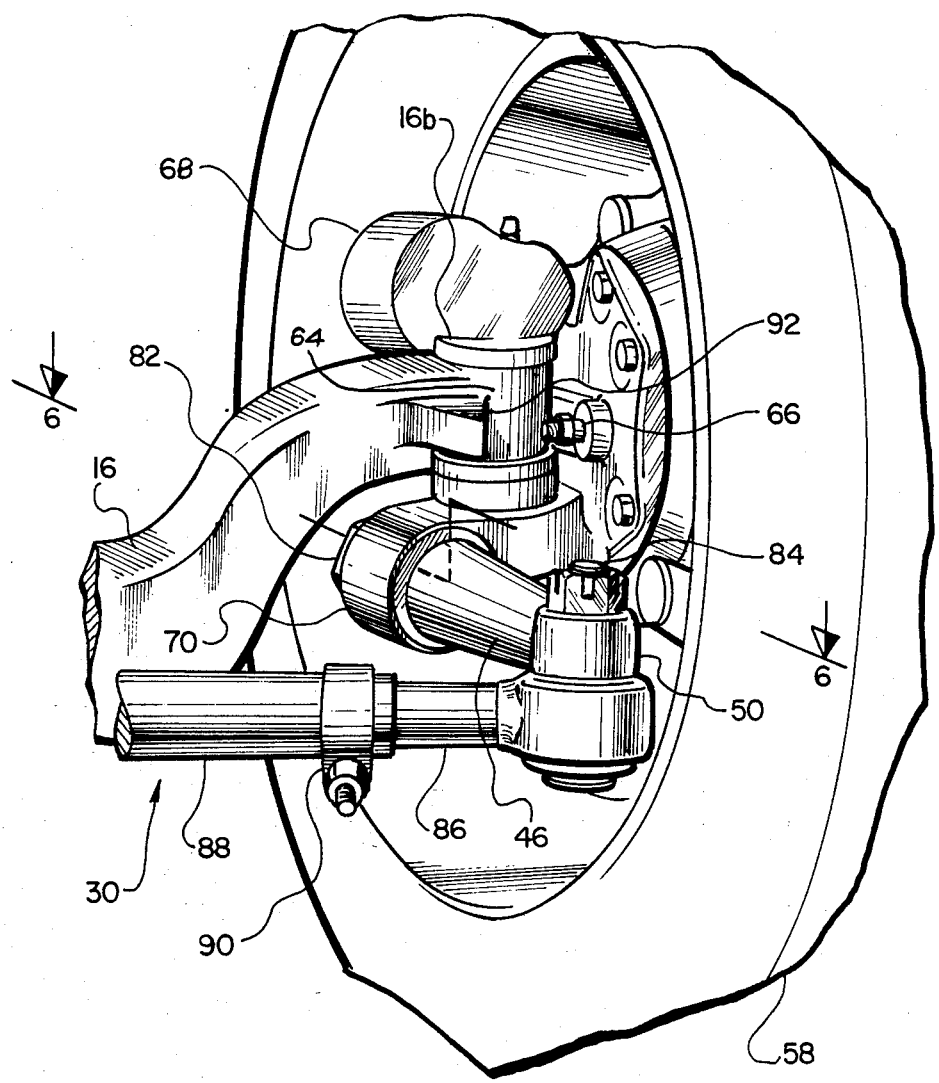
FIG. 7 is a view of the FIG. 5 mechanism, viewed generally along lines 66 of FIG. 6, but with the wheel turned to the left.

Turning now more particularly to FIGS. 5, 6 and 7, in a typical truck wheel assembly 56, including a spindle, axle, king pin, steering arm and tie rod assembly incorporating this invention, the same right-hand wheel 14b described above is illustrated. It will be apparent that a mirror image of this assembly is also present in connection with wheel 14a upon the left-hand side of the vehicle.

The wheel 14b, having a tire 58 mounted upon it, also includes a conventional internally mounted spindle assembly or king pin assembly 60. This assembly, which will be described only in that amount of detail required for a full understanding of the invention, has a backing plate 62 mounted to facilitate wheel rotation relative to it. Extending outward from a boss 64 upon the backing plate 62 is a threadedly adjustable stop bolt 66. Extending outward from and integral with the backing plate 62 is a pair of spindle legs 68 and 70, generally defining a U-shaped casting together with the backing plate 62, as best shown in FIGS. 6 and 7.

The axle 16, having a boss member 16a, with a hole 71 therethrough, is nested between the spindle legs 68 and 70 such that relative angular movement therebetween is accommodated. A pair of aligned holes (not shown) through the respective spindle legs 68 and 70, and which are positioned in mutual alignment with the axle boss hole 71, have a king pin 76 inserted completely therethrough to support the mentioned relative angular movement. Each of these components is found in standardly designed and manufactured trucks, sometimes with variations in detail, but the basic action is the same. Similarly, the lower spindle leg 70 is drilled with a generally horizontal hole 78 to accept in nesting relationship the shank 36 of the steering arm 32 in a conventional manner. It includes (FIG. 5) a cylindrical portion 78a and a tapered portion 78b, with a shoulder 78c therebetween, to accept and mate with the steering arm shank 36 in a snug-fitting relationship. The cylindrical hole portion 78a includes an axially extending keyway 78d to match the keyway 37 in the steering arm shank 36 and to mutually accept a key 80. The steering arm 36 is thereby positively retained against rotation relative to the king pin assembly 60. It is secured in place by a castellated nut 80 and is cotter pinned. When so positioned, the arm portion 46 of the steering arm 32 extends at an angle toward and, depending upon the specific wheel and spindle assembly involved, sometimes slightly into the well of the wheel 56.

Attached to the boss 50, for relative swivelling movement, by a properly secured bolt 84 is the tie rod 30 comprising a threaded and drilled rod end 86, a central tube 88, and an interconnecting clamp 90. Thus, lateral movement of the tie rod 30, as indicated by the arrow 91, causes the entire wheel 56 to be moved angularly relative to the axle 16 via the steering arm 32 and the king pin assembly 60.

Angular movement of this wheel and spindle assembly to the right, as shown in FIG. 5, is limited by the inward or outward adjustment of the stop bolt and its abutment against a stop 92 extending outward from an adjacent side of the axle 16. Movement in the opposite direction is limited by an identical mechanical arrangement on the left wheel and spindle assembly.

Toe in and toe out are established by screwing the tie rod tube 88 relative to the rods end 86 and its counterpart on the opposite and, thereby lengthening or shortening the tie rod assembly 88 and adjusting the toe condition.

Industrial Applicability

It has been found that a combination of components assembled in substantially the foregoing manner results in the several advantages set forth in the foregoing objectives. A principal advantage has been found to reside in an ability to achieve essentially a pure turning and rolling action over a wide range of turning radii. The important result from both the economical and the operational standpoint is a significant reduction in the tendency of the steerable wheels, particularly the outside wheel, to slide, scuff or skip during the turn, with a concomitant excessive wear of the tires. Hence, the more nearly the wheels, during their turning maneuver, can be caused to approach this ideal pure rolling motion, the easier and better the operator is able to maintain control of the vehicle and the less rubber is likely to be scuffed from the tires surfaces.

It will be readily recognized that at least a part of this result flows from the fact that truck engines are very powerful and that if a wheel cramped into a turning posture is not turned sufficiently to facilitate its rolling properly, the power of the truck will force the tire to skid through the turn, thereby applying an undesirable force to the mechanical components, which results in their premature wear and breakage, and the scuffing of an untennable amount of rubber from the tire surfaces. A high force is also applied to the tire sidewalls in such inaccurate turns. The reduction of these power-induced loads by accommodating a more efficient rolling action, by virtue of incorporating the present invention, thereby reduces mechanical wear and breakage and increases the life of both the tread and the sidewall of tires.

Recorded evidence has indicated that tire life has been doubled, and in isolated cases even tripled, as a result of utilizing the teachings of this invention.

It has also been found that the maneuverability of vehicles, insofar as the ability to negotiate tight turns is concerned, is substantially improved by virtue of this invention. For example, steering systems both before and after incorporation of the features of the present invention have been set by adjusting the stop bolt 66 to the same 28° angular relationship between the wheel and the axle. Before this invention was incorporated the test truck could achieve a turning radius of approximately only 23°–25° in a full turn. Following incorporation a turning radius of 28°–29° was achieved in a full turn. This is a highly significant difference in maneuverability enhancement.

It has additionally been determined, both from imperical results and from computer analysis, that the incorporation of this invention results in a more accurate turn as a result of being able to more properly adjust the toe of the wheels and thereby assisting in achieving the improved turning movements described. In achieving this result the vehicle wheel base, axle length, tie rod length and steering arm length, with the arm configuration for the improved results being as described above.

Computer studies, utilizing a truck having a 254" wheelbase and a 5.75" steering arm configured in accordance with this invention, and considering properly matched axle lengths of from 63" to 74" and tie rod lengths ranging from 62" to 73", that the best toe angle for maximizing operational efficiencies of the system described above is significantly less than used in normal practice. Whereas an average toe out of 6.2 in conventional systems was shown in a sampling of twelve vehicles, installation of the system of this invention resulted consistently in a correction toward the toe in position of 4.5", or any average resultant toe out of 2". Hence, the average toe out correctin was 310%. Otherwise stated, the average toe out when this invention is utilized is 310% less than when the invention is not used.

The features and characteristics described above, which result in the benefits enumerated, are provided by way of illustration and example only and are not to be taken as limiting either the spirit or scope of the invention.

We claim:

1. A steerable control system for a roadable vehicle including a double ended front axle having a pair of wheels steerably mounted for rotation upon said ends, a double ended tie rod mounted adjacent and generally parallel to said axle, a pair of steering arms interconnecting the respective wheels to said tie rod ends,
   each said steering arm being configured to extend generally rearward and outward toward said wheels and outward from a longitudinal axis of the vehicle, and having a first axis generally normal to the rotational axis of the wheel to which connected and a second axis angled outward from said first axis.

2. The steerable control system of claim 1 wherein the angle between said first and second axes of each said steering arm is between 20° and 30°.

3. The steerable control system of claim 1 wherein the angle between said first and second axes of each said steering arm is approximately 25 degrees.

4. A steering arm for use in a steering system for roadable vehicles having steerable wheels with spindle sockets, the invention comprising:
   an axial shaft portion tapered to nest within a mating region in a wheel spindle socket in a steerable wheel of the vehicle;
   a threaded end extending axially outward from said shaft portion;
   an arm section extending from said shaft portion at an angle therefrom, adapted to extend toward the vehicle wheel, and being of a length to extend not beyond the wheel; and
   an end portion upon an extremity of said arm section and perforated to receive a tie rod end connected thereto.

5. The steering arm of claim 4 wherein
   the axis of said arm section extends from said shaft portion at an angle of between about 20 and 30 degrees from the axis of said shaft portion.

6. The steering arm of claim 4 wherein
   said arm section extends from said shaft portion at an angle of about 25 degrees from the axis of said shaft portion.

7. The steering arm of claim 4 wherein
   said end portion perforation is tapered to receive a tapered pin for connection of a tie rod end.

8. A steering control system for the front end of a roadable vehicle with a transversely mounted front axle having opposite ends upon which a pair of steerable wheels are mounted via a king pin through a king pin assembly having a spindle member extending outward from the wheel and positioned inwardly of the king pin, the improvement comprising:

a pair of steering arms each including a straight shank portion having a straight first axis and being fixedly attached to one of the spindle members;

a control arm portion of said steering arm angled generally rearward and outward along a second axis toward its adjacent wheel and terminating in a boss member drilled for attachment of a tie rod; and a double ended tie rod connected to said boss members and thereby interconnecting said steering arms and of a length to provide a toe out wheel condition, whereby the foregoing combination results in a truer rolling action and a tighter turning radius than in conventional systems.

9. The steering control system of claim 8 wherein said control arm portion of each said steering arm extends into a well upon an inner side of its adjacent wheel.

10. The steering control system of claim 8 wherein said control arm portion of each said steering arm is of a length such that said tie rod is behind the axle when the wheels are in their straight forward positions in a distance of between about 3 to 6 inches.

11. The steering control system of claim 8 wherein the length of said tie rod is such that the toe out of the wheels approximates 2 inches in a full turn.

12. The steering control system of claim 8 wherein the toe out of the wheels approximates 300 percent less than that in standard vehicles.

13. The steering control system of claim 8 wherein said control arm portion of said steering arm, utilized upon a truck having a wheelbase of about 254 inches and an axle length of between about 62 and 74 inches, the control arm portion length is about 2.75 inches, said tie rod is between about 62 and 73 inches in length, and the toe out of the wheels is about 2 inches in a full turn.

14. A steering arm for use in a steering system for roadable vehicles having wheels with spindle sockets, the invention comprising:

an axial shaft portion tapered to nest within the wheel spindle sockets;

a threaded and extending axially outward from said shaft portion;

an arm section extending from said shaft portion at an angle therefrom and adapted to extend toward the vehicle wheel and being of a length to extend not beyond the wheel; and an end portion upon an extremity of said arm section and perforated to receive a tie rod end connected thereto.

15. The steering arm of claim 14 wherein said arm section extends said shaft portion at an angle of between about 20 and 30 degrees from the axis of said shaft portion.

16. The steering arm of claim 4 wherein said end portion perforation is tapered to receive a tapered pin for connection of a tie rod end.

* * * * *

Disclaimer 4,600,205.—*Denzil S. Stewart; Alfred J. Bland*, both of Canoga Park; *Donald D. Rogers*, Moorpark, all of Calif. STEERING APPARATUS FOR MOTOR VEHICLES. Patent dated July 15, 1986. Disclaimer filed June 18, 1990, by the assignee, Steering Control Systems, Inc.

Hereby enters this disclaimer to claims 1, 4, 7, 8, 9, 10, 14, and 16 of said patent.
[*Official Gazette September 18, 1990* ]